US008203487B2

(12) United States Patent
Hol et al.

(10) Patent No.: US 8,203,487 B2
(45) Date of Patent: Jun. 19, 2012

(54) TIGHTLY COUPLED UWB/IMU POSE ESTIMATION SYSTEM AND METHOD

(75) Inventors: Jeroen D. Hol, Enschede (NL); Freerk Dijkstra, Hengelo (NL); Hendrik Johannes Luinge, Enschede (NL); Per Johan Slycke, Schalkhaar (NL)

(73) Assignee: Xsens Holding, B.V., Enschede (NL)

( * ) Notice: Subject to any disclaimer, the term of this patent is extended or adjusted under 35 U.S.C. 154(b) by 290 days.

(21) Appl. No.: 12/534,607

(22) Filed: Aug. 3, 2009

(65) Prior Publication Data
US 2011/0025562 A1 Feb. 3, 2011

(51) Int. Cl.
*G01S 3/02* (2006.01)
(52) U.S. Cl. ....................... 342/463
(58) Field of Classification Search .......... 342/362–364, 342/463
See application file for complete search history.

(56) References Cited

U.S. PATENT DOCUMENTS

| | | | |
|---|---|---|---|
| 6,300,903 B1 | 10/2001 | Richards et al. | |
| 6,900,732 B2 | 5/2005 | Richards et al. | |
| 7,372,403 B2 | 5/2008 | Fullerton et al. | |
| 7,411,539 B2 * | 8/2008 | Valand | 342/13 |
| 2009/0079633 A1 | 3/2009 | Ward | |
| 2009/0209343 A1 * | 8/2009 | Foxlin et al. | 463/36 |

OTHER PUBLICATIONS

Tanigawa, Makoto, et al., "Drift-Free Dynamic Height Sensor Using MEMS IMU Aided by MEMS Pressure Sensor", *WPNC 2008 5th Workshop on Positioning, Navigation and Communication*, Mar. 2008, pp. 1-6.
Pittet, Sylvain, et al., "*UWB and MEMS Based Indoor Navigation*", Royal Institute of Navigation, *The Journal of Navigation*, vol. 61, No. 3, Jul. 2008, pp. 369-384.
Sczyslo, Sebastian, et al., "Hybrid Localization Using UWB and Inertial Sensors", *Proceedings of the 2008 IEEE International Conference on Ultra-Wideband* (ICUWB2008), vol. 3, Hanover, Germany Sep. 2008, pp. 89-92.
Tanigawa, Makoto, et al., "Augmentation of Low-cost GPS/MEMS INS with UWB Positioning System for Seamless Outdoor/Indoor Positioning", *Proceedings of the 21st International Technical Meeting of the Satellite Division of the Institute of Navigation ION GNSS*, Sept 2008, 8 pages total.
Steggles, Pete, et al., "Local Positioning Systems: New Possibilities for Urban Combat Training", *Ubisense White Paper presented at IITSEC*, Dec. 2003, pp. 1-21.
Hol, Jeroen, et al., "Tightly Coupled UWB/IMU Pose Estimation", *Proceedings of the IEEE Conference on Decision and Control (CDC)*, Shanghai, China, Dec. 2009, 5 pages total.
Cooper, G. et al., Inertial sensor-based knee flexion/extension angle estimation, *Journal of Biomechanics* 42 (2009) pp. 2678-2685.

* cited by examiner

*Primary Examiner* — Thomas Tarcza
*Assistant Examiner* — Nga X Nguyen
(74) *Attorney, Agent, or Firm* — Miller, Matthias & Hull LLP

(57) ABSTRACT

A six-degree-of-freedom (6DOF) tracking system adapts aspects of Ultra-Wideband (UWB) measurement and microelectromechanical systems (MEMS) inertial measurements within a unique tightly coupled fusion algorithm to accurately and efficiently measure an object's position as well as orientation. The principle of operation of the system protects against the negative effects of multipath phenomenon and non-line-of-sight (NLOS) conditions, allowing a more robust position and orientation tracking system.

18 Claims, 14 Drawing Sheets

TIGHTLY COUPLED UWB/IMU POSE ESTIMATION SYSTEM AND METHOD

BACKGROUND OF THE INVENTION

Ultra-wideband (UWB) is an impulse radio based positioning and communication technology applicable primarily for indoor applications that require very large area tracking. Attractive properties of UWB compared to other RF-based communication and positioning technologies include a high immunity to interference and multi-path effects, using very small amounts of energy. UWB is often used in asset tracking systems, e.g., in health-care, logistics or manufacturing. Commercially available systems typically consist of a network of synchronized UWB receivers which track a large number of small, battery powered and inexpensive UWB transmitters, typically capable of transmitting signal bursts at several times per second. One example of such known systems is PLUS from Time Domain of Huntsville, Ala. in the United States. Another is the Series 7000 System from Ubisense Ltd. of Chesterton, Cambridge, in the United Kingdom.

Reported indoor position accuracies lie in the order of several decimeters for horizontal plane tracking only (2D), under favorable conditions, however, UWB technology suffers from numerous potential error and failure mechanisms such as: signal blockage due to signal absorption or attenuation and signal lock on strong multi-path (reflections) instead of direct path signal (e.g. when it is attenuated) or transmission through a material with a refraction index larger than that of vacuum causing a delay in the measured time of flight of the signal. Often such errors occur under non-line-of-sight (NLOS) conditions, but the positions derived from UWB systems also often include many outliers because of the poor geometry of practical receiver placements or the existence of multiple solutions to the resulting equations and the presence of noise, quantization and time measurement errors.

The limitations of UWB systems based on time of arrival (TOA) for position tracking due to practical limitations in the geometry of the placement of the readers is very important. Due to the fact that buildings and rooms are in practice often longer and wider than they are high, the choice in UWB receiver placement is limited. Systems known in the art consequently are typically limited to tracking in 2D (horizontally), assuming a known height of the UWB receiver and UWB transmitter. Systems that do perform 3D tracking perform very badly in tracking vertical position. Even in rooms or spaces that are very high, where the UWB receiver placement can be configured more advantageous for the purpose of tracking in 3D, the solution is very limited since a person would typically move on or close to the ground. This means that the geometry of UWB receiver placement is still not symmetric, causing less than ideal vertical and time dilution of precision.

These problems are most prominent while tracking moving objects or persons and can give rise to distorted and/or "jumpy" calculated trajectories. Although the performance obtained using UWB for asset management is often sufficient for that application and errors could be reduced for example by assuming a motion model, many potential application areas have much more stringent performance requirements, including increased accuracy, 3D position tracking, tracking of 3D orientation, smooth 3D velocity and angular velocity tracking, and a very high robustness against errors. Thus, the current state of the art in UWB tracking does not provide sufficient quality of measurement and error resistance to allow robust application in many application areas. Although these problems can be mitigated to an extent by complicated and expensive UWB receiver placement, it is an object of the invention to solve these problems in a more cost effective manner, while making the system easy to use, install and maintain, keeping in mind the practical geometries for typical buildings or outdoor setups.

BRIEF SUMMARY OF THE INVENTION

The invention provides a six-degree-of-freedom (6DOF) tracking system that is able to employ both Ultra-Wideband (UWB) measurements and microelectromechanical systems (MEMS) inertial measurements. A tightly coupled system according to the one aspect of the invention estimates position as well as orientation of a sensor unit while protecting against the negative effects of multipath phenomenon and non-line-of-sight (NLOS) conditions.

In an embodiment of the invention, a method is provided for allowing six-degree-of-freedom (6DOF) tracking of an object by (a) affixing a sensor unit to the object, wherein the sensor unit includes a plurality of UWB transmitters, each being adapted to transmit a UWB signal, and a plurality of inertial measurement sensors, (b) receiving, remotely from the object, data from each of the plurality of UWB transmitters and the plurality of inertial measurement sensors, and (c) processing the received data from the plurality of UWB transmitters and the plurality of inertial measurement sensors via a tightly coupled sensor fusion algorithm to yield an estimate of a position and orientation of the object.

In a further aspect of the invention, the plurality of inertial measurement sensors are microelectromechanical systems and comprise at least one rate gyroscope and at least one accelerometer. In another aspect of the invention, the plurality of UWB transmitters and the plurality of inertial measurement sensors are synchronized at the hardware level, i.e. synchronized by means of a physical electronic connection triggering an interrupt or the like to reach a time synchronization between the systems substantially better than 1 ms.

Other objects, features, and advantages of the invention will be appreciated from the detailed description, taken in conjunction with attached drawing figures of which:

DETAILED DESCRIPTION OF THE INVENTION

To improve the tracking performance and especially the positioning accuracy of UWB so that it is usable in other applications, the inventors have provided a low-cost micro electro mechanical system (MEMS) inertial measurement unit (IMU) consisting of rate gyroscopes and accelerometers. The IMU provides accurate position tracking for short periods of time, but is drift prone for longer timescales. However, the resultant arrangement of the invention when used as disclosed, provides a robust system, capable of detecting and rejecting multipath effects and accounting for NLOS conditions. Improved tracking is also facilitated by the disclosed system, especially with respect to dynamic quantities such as velocity, and the orientation of the tracked asset becomes observable as well.

This results in a system providing a 6 degree-of-freedom (DOF) general purpose tracking solution for indoor applications. Although there are potentially reports in the literature of a hybrid 2D positioning tracking algorithm and an EKF for pedestrian tracking, neither of these systems operates according to the disclosed principles or provides the disclosed advantages. For example, both the hybrid 2D positioning tracking algorithm and the EKF for pedestrian tracking are (a) only loosely coupled and (b) estimate only a limited number of degrees of freedom.

The phrase "loosely coupled," as used herein, refers to a solution where the measurements from one or several of the individual sensors are preprocessed before they are used to compute the final result. A "tightly coupled" approach on the other hand is an approach wherein all of the measurements are used directly to compute the final result. This patent discloses a full 6DOF tracker estimating both position and orientation based on a tightly coupled fusion of UWB and inertial sensors. In order to obtain heading (i.e., the angle around the vertical) observability, the measured object must undergo (regular) accelerations.

Figure 1A:
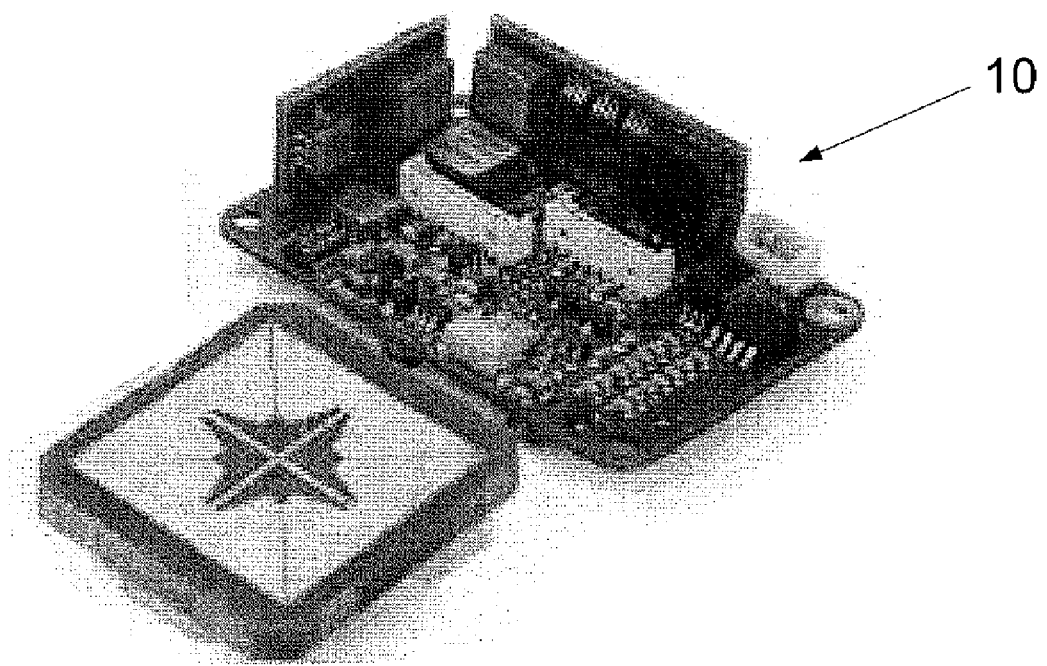
FIG. 1A is a perspective view of the sensor unit in keeping with the present invention, integrating an IMU and an UWB transmitter into a single unit.
Figure 1B:
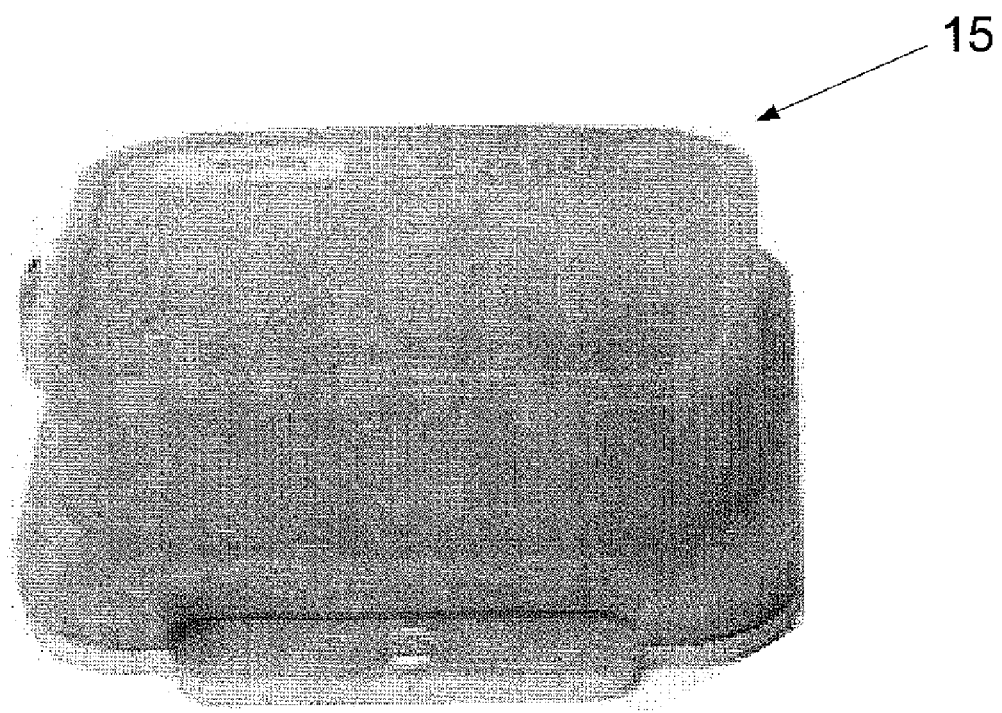
FIG. 1B is a perspective view of a sensor unit housing for protecting and mounting the unit shown in FIG. 1.

Having given the above overview, the description will now focus on the details of an exemplary system according to the invention, as well as an example context within which the principles of the invention may be applied. In an embodiment of the invention, the physical tracking system is similar to commercially available asset tracking systems. However, instead of functioning via a simple UWB transmitter, an IMU and UWB transmitter are integrated in a single unit, as shown in the device 10 of FIG. 1.

In a preferred implementation the IMU and UWB transmitter are synchronized at the hardware level, simplifying the signal processing required for tight coupling of the measurements. The sensor unit 10 may be housed in a suitable housing, e.g., as shown at element 15 of FIG. 1A, in order to protect the circuitry and components and also to allow the senor unit to be fixedly attached to an item of interest for position tracking.

Figure 2:
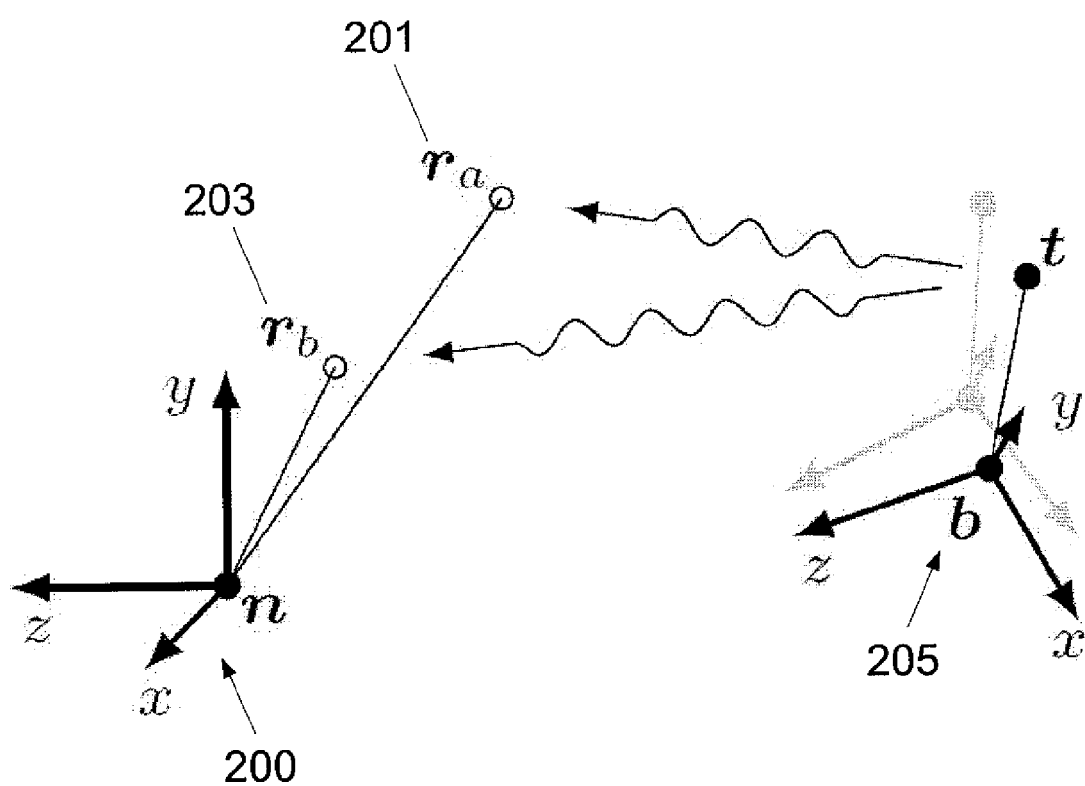
FIG. 2 is a schematic illustration of the sensor unit orientation, shown at two time instants, consisting of an IMU (b) and a UWB transmitter (t), whereby transmitted signals are detected by the UWB receivers (r) in the navigation (n) frame.

In operation, pulses transmitted by the sensor unit 10 are detected by a network of UWB receivers having synchronized clocks. This arrangement gives rise to the multiple coordinate frames illustrated in FIG. 2. One such coordinate frame is the Navigation frame 200($n$). The sensor unit 10 position and orientation (pose) are estimated with respect to this stationary coordinate frame 200. The coordinate frame 200 may be defined arbitrarily, although in the illustrated example, the frame 200 is aligned with the room, i.e., with the vertical axis pointing up. The UWB receiver positions 201 and 203 are known in this frame and are, without loss of generality, assumed to be constant.

A second coordinate frame is the body frame 205($b$). This frame 205 is the coordinate frame of the moving IMU. The origin of the body frame 205 is located in the center of the accelerometer axes, and it is preferably aligned to the casing 15. In an embodiment of the invention, all of the inertial measurements are resolved in the body coordinate frame 205. In an embodiment of the invention, the plurality of inertial measurement sensors are synchronized at the hardware level, i.e. synchronized by means of a physical electronic connection triggering an interrupt or the like to reach a time synchronization between the systems substantially better than 1 ms.

These coordinate frames are used to express quantities in as well as to denote their origin. For instance, $b^n$ is the position of the body coordinate frame 205 expressed in the navigation frame 200 and $q^{bn}$, $\phi^{bn}$ and $R^{bn}$ are the unit quaternion, the rotation vector and the rotation matrix, respectively. The foregoing measures are interchangeable and describe the rotation from the navigation frame 200 to the body frame 205.

Other quantities of interest with respect to the calculations described herein are the positions of the UWB transmitter and receivers, denoted t and $r_m$ respectively. The UWB transmitter and the IMU are rigidly connected such that $t^b$ is a known constant. One object of the invention in an embodiment thereof is to track the position and orientation of the sensor unit, i.e., to estimate both the position of the body expressed in the navigation frame, $b^n$, and the orientation of the body with respect to the navigation frame, $q^{bn}$.

Figure 3:
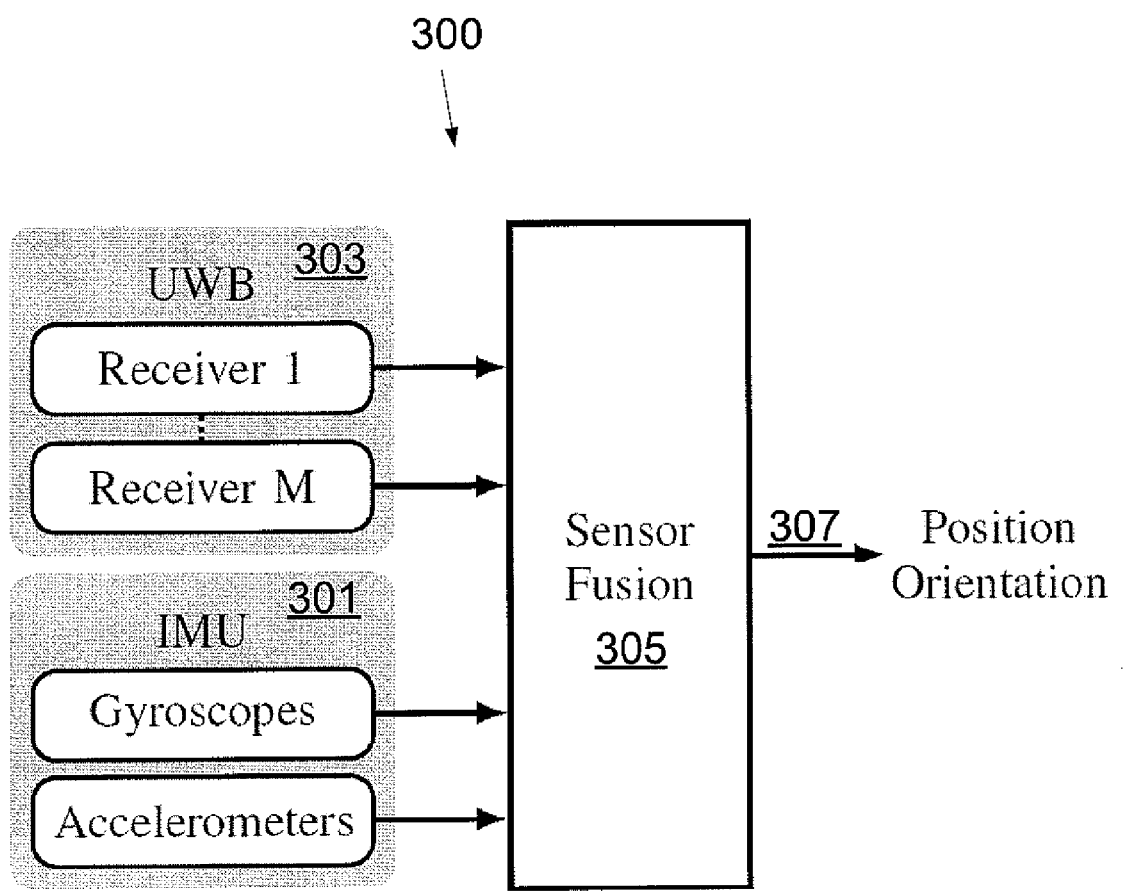
FIG. 3 is an architectural overview of tightly coupled sensor fusion, wherein the 'raw' measurements from the m UWB receivers and the IMU are directly used for sensor fusion.

In order to estimate these quantities, a tightly coupled sensor fusion described herein was developed and used, as illustrated in exemplary form at FIG. 3. In the tightly coupled sensor fusion system 300 of the invention, the "raw" or unprocessed measurements from the IMU sensing components 301 such as accelerometer, gyroscope and UWB receivers 303 such as time of arrival (TOA) measurements are directly used for sensor fusion 305, rather than using preprocessed output quantities such as position or orientation. Because of this innovation, there is no explicit triangulation module as typically found in ordinary (i.e., loosely coupled) UWB positioning systems. Instead, the triangulation of position is performed only implicitly in the course of executing the sensor fusion algorithm to produce the estimated output position/orientation 307.

Although the prior art has apparently found it advantageous to use the current loosely coupled technology, the present inventors have devised a tightly coupled system that provides numerous surprising benefits over the state of the art systems. Although the prior art insists upon preprocessing the raw measurements to provide higher level information (e.g. position estimates) and therefore to provide less information that needs to be further processed, the inventors have had the significant insight that the information lost during preprocessing may not be extraneous at all, but may in fact be useful for executing a positioning and verification function.

Moreover, the inventors have recognized that tightly coupled sensor fusion can perform hypothesis testing for the individual sensors and efficiently deal with outliers. This previously unseen benefit is especially useful for UWB measurements, where outliers occur regularly due to multipath effects and/or NLOS conditions. Unlike other processes, the tightly coupled sensor fusion of the invention is able to disregard the affected measurements while still utilizing the remaining unaffected measurements. Additionally, the available inertial information gives accurate predictions of the UWB measurements, which allows for enhanced outlier detection.

Hence, the inventors have discovered that the tightly coupled sensor fusion system described herein is far more robust than traditional systems. The basic component of the sensor fusion method is a state space model of the underlying process. However, before progressing too quickly in this description, the inventors first present more basic information for the convenience of the reader, to be later built upon through specific examples and discussions.

An inertial measurement unit as used herein consists of accelerometers and rate gyroscopes. The gyroscopes measure angular velocity or rate-of-turn $\omega$. The accelerometers do not measure accelerations directly, but rather measure the so-called external specific force f to which the linear acceleration $\ddot{b}$ and the earth's gravitational field g contribute. The measurements from the accelerometers and gyroscopes can be used to compute the position and orientation of an object relative to a known starting point using inertial navigation. In a strap down configuration such as the sensor unit described herein, the measurements are resolved in the body coordinate frame, rather than in an inertial reference frame. Hence, the orientation $q^{nb}$ can be calculated by integrating the angular velocity $\omega_{nb}^{b}$. The position $b^n$ can be obtained by double integration of the acceleration $\ddot{b}^n$, which in turn is found by rotating the external specific force $f^b$ using the known orientation $q^{nb}$ and subtracting the acceleration due to gravity.

Figure 4:
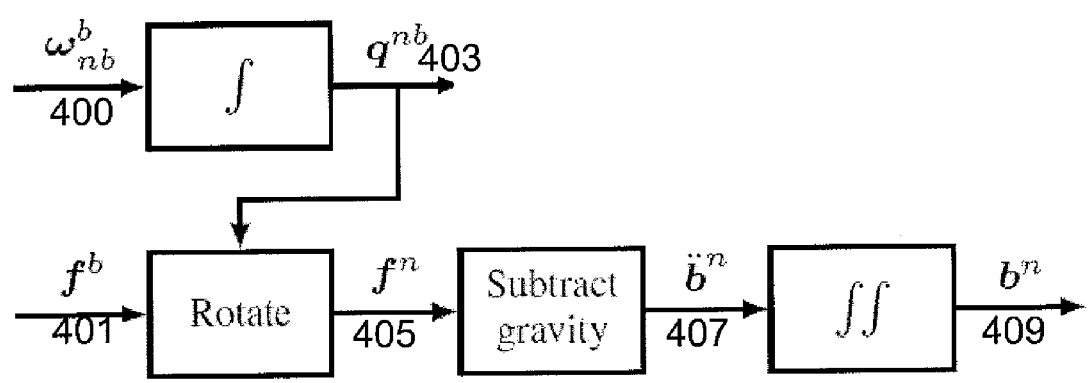
FIG. 4 is a schematic illustration of a strap down inertial navigation algorithm.

This procedure is illustrated in FIG. 4. The angular velocity $\omega_{nb}^{b}$ 400 and the external specific force $f^b$ 401 are measured by the gyroscope and the accelerometer. These measurements include bias and noise terms which often cause errors in the calculated position and orientation. This integration drift is inherent to all inertial navigation and, when using MEMS inertial sensors, the integration drift can be relatively significant. With this in mind, it will be appreciated that the orientation estimate, and especially the position estimate, are only accurate and reliable for a short period of time. The angular velocity $\omega_{nb}^{b}$ 400 is processed to yield the estimated orientation $q^{nb}$ 403, and the estimated orientation $q^{nb}$ 403 and external specific force $f^b$ 401 are processed to yield $f^n$ 405. The value $f^n$ 405 is processed to subtract gravity, resulting in the value $\ddot{b}^n$ 407. Finally, $\ddot{b}^n$ 407 is integrated to yield position $b^n$ 409.

Summarizing the above discussion, the gyroscope measurements are modeled as $u_\omega = \omega_b^{nb} + \delta_\omega^b + e_\omega^b$. Here, $\omega_b^{nb}$ is the angular velocity, body to navigation, expressed in the body frame, $\delta_\omega^b$ is a slowly time-varying bias term and $e_\omega^b$ is i.i.d. Gaussian noise. Furthermore, the accelerometer measurements are modeled as $u_a = f^b + \delta_a^b + e_a^b = R^{bn}(\ddot{b}^n - g^n) + \delta_a^b + e_a^b$, where $f^b$ is the external specific force expressed in the body coordinate system, $\delta_a^b$ is a slowly time-varying bias and $e_a^b$ is i.i.d. Gaussian noise. The second expression in (2) splits the specific force into its contributions from the linear acceleration of the sensor $\ddot{b}^n$ and the gravity vector $g^n$, both expressed in the navigation frame 200. These vectors have been rotated to the body frame 205 using the rotation matrix $R^{bn}$.

Turning to UWB, Ultra-wideband technology makes use of radio with very short pulses, typically ≈1 ns, resulting in a very high spatial resolution. The positioning technologies can be roughly subdivided into three categories: systems using time delay, systems using angle-of-arrival and systems using signal strength. The present discussion will focus on time based methods, where position is inferred from the time it takes for a signal to travel from the transmitter to the receiver. However, it will be appreciated that other forms of UWB measurement, in particular angle-of-arrival techniques, may be adapted to the tightly coupled sensor fusion technique described herein.

The UWB setup consists of a network of synchronized UWB receivers, all taking very precise TOA measurements of signals originating from the transmitter in the sensor unit. That is, the measurement of the m-th receiver is given by $y_m = \tau + \|r_m^n - t^n\|_2 + e_{um}$, where $\tau$ is the time of transmission, $r_m^n$ is the position of the m-th receiver in the navigation frame, $t^n$ is the position of transmitter in the navigation frame and $e_{um}$ is i.i.d. Gaussian noise. All quantities in the foregoing equation are expressed in meters. Since only one-way communication (i.e., from the transmitter to the receiver, is implemented in this arrangement, the transmitter clock is not synchronized with the receiver clocks nor is the clock accurate enough to know the precise time of transmission $\tau$. Therefore, the time of transmission $\tau$ is treated as an unknown in this arrangement.

Known processes of determining the transmitter position from the UWB measurements is referred to as triangulation, and may be executed in any of a number of ways. One common technique is to eliminate the time of transmission $\tau$ from the foregoing equation by constructing time difference of arrival (TDOA) measurements from pairs of measurements. The resulting set of hyperbolic equations can then be solved for position. An important drawback of this approach is that the constructed TDOA measurements are no longer independently distributed.

An alternative novel triangulation method is to treat $\tau$ as an unknown and to solve for position and time. Assuming Gaussian noise, maximum likelihood estimation takes the form of a nonlinear least squares problem $$\min_{t^n, \tau} \sum_{m=1}^{M} (y_m - \tau - \|r_m^n - t^n\|_2)^2$$

which can be solved (see J. Nocedal and S. J. Wright, *Numerical optimization*, New York: Springer-Verlag, 2006).

The inertial and UWB measurement models are linked by a process model, which describes the motion of the sensor unit. Since it is difficult to make useful assumptions regarding general sensor unit movement, the inertial sensors are used as inputs $u_t$ for the process model rather than treating them as measurements.

Proceeding to resolve position, velocity, and orientation, we have:

$$b_{t+1}^n = b_t^n + T\dot{b}_t^n + \frac{T^2}{2}\ddot{b}_t^n,$$

$$\dot{b}_{t+1}^n = \dot{b}_t^n + T\ddot{b}_t^n,$$

$$q_{t+1}^{bn} = e^{-\frac{T}{2}\omega_{nb,t}^b} q_t^{bn},$$

where $b^n$ and $\dot{b}^n$ and denote the position and velocity of the body resolved in the navigation frame, $q^{bn}$ is a unit quaternion describing the orientation of the body frame relative to the navigation frame and T denotes the sampling interval.

Furthermore, is the quaternion multiplication and the quaternion exponential is defined as:

$$e^{(\theta,v)} \triangleq \left(\cos\|v\|, \frac{v}{\|v\|}\sin\|v\|\right).$$

The acceleration $\ddot{b}_t^n$ and angular velocity $\omega_{nb,t}^b$ are calculated from the accelerometer measurement $u_a$ and the gyroscope measurement $u_\omega$ according to $$\ddot{b}_t^n = R_t^{nb} u_{a,t} + g^n - R_t^{nb}\delta_a^b - R_t^{nb} e_{a,t}^b,$$

$$\omega_t^{nb} = u_{\omega,t} - \delta_\omega^b - e_{\omega,t}^b,$$

The inertial bias terms $\delta_a^b$ and $\delta_\omega^b$ are slowly time-varying. Hence, they are included in the process model as random walk, according to $$\delta_{a,t+1}^b = \delta_{a,t}^b + v_{\delta a,t}^b,$$

$$\delta_{\omega,t+1}^b = \delta_{\omega,t}^b + v_{\delta\omega,t}^b,$$

where $v_{\delta a}^b$ and $v_{\delta \omega}^b$ are i.i.d. Gaussian noises.

The time of transmission $\tau$ has to be included in the model as well. Since the transmitter sends in regular intervals, $\tau$ is modeled as an integrated random walk $$\tau_{t+1} = \tau_t + T\dot{\tau}_t + v_{\tau,t},$$

$$\dot{\tau}_{t+1} = \dot{\tau}_t + v_{\dot{\tau},t},$$

where $v_\tau$, $v$ are i.i.d. Gaussian noises. Here, $v_\tau$ is used to model the jitter inherently present in the clock.

The UWB measurement model requires the transmitter position $t^n$. The sensor unit motion, however, is modeled using the pose of the body coordinate system $q^{bn}$, $b^n$. Hence, the relation $t^m = b_t^n + R^{nb} t^b$ is used to calculate $t^n$.

From the above equations, we obtain a discrete-time non-linear state-space model with state vector:

$$x = ((b^n)^T, (\dot{b}^n)^T, *(q^{bn})^t, (\delta_a^b)^T, (\delta_\omega^b)^T, \tau, \dot{\tau})^T$$

The above derivation assumes time synchronized (aligned) measurements of UWB TOA and inertial measurements. This is not strictly necessary and the above can be adapted to accommodate systems that are not hardware synchronized, but for clarity the above assumes hardware synchronization (time alignment).

The discrete-time nonlinear state-space model is used in combination with an extended Kalman filter (EKF) to fuse the TOA and inertial measurements. The EKF accommodates the different sample rates and a varying number of measurements in a straightforward manner. It runs at the high data rate of the IMU (e.g., 200 Hz) and the UWB updates (e.g., 50 or 10 Hz) are only performed when measurements are available. Outliers from NLOS and/or multipath effects are detected using hypothesis testing on the residuals/innovations of the EKF, $\epsilon_t = y_t - \hat{y}_{t|t-1}$, the difference between the observed measurement $y_t$ and the one-step ahead prediction from the model $\hat{y}_{t|t-1}$. In absence of errors, the residuals are normal distributed as $$\epsilon_t \sim N(0, C_t P_{t|t-1} C_t^T + R_t)$$

where $P_{t|t-1}$ denotes the state covariance, $C_t$ denotes the measurement Jacobian and $R_t$ denotes the covariance of the measurement noise. This allows the calculation of confidence intervals for the individual measurements and in case these are violated, the measurement is considered an outlier and is ignored. In the calculations for detection of outliers, additional information can be considered, such as the received signal strength indication (RSSI), and other data.

The proposed system was used to track a test subject walking around in a relatively large room of approximately 18×8× 2.5 meters in size. The test room was equipped with 6 synchronized UWB receivers attached to the ceiling at known locations and at equal height. The mobile sensor unit was mounted on the test subject's foot, since this is a position with relatively high dynamics and would thus present a good test condition. Complications included regularly occurring NLOS conditions due to occlusion by the body—a medium with a reduced speed of light—as well as multipath effects from signals reflected by the floor in case these multi-path signals are predominant (e.g. stronger or less distorted) than the direct path signals. These complications result in difficulties during traditional triangulation. However, as will be seen, the innovative system presented herein was able to appropriately handle these difficulties and still yield acceptable results during the test.

Figure 5:
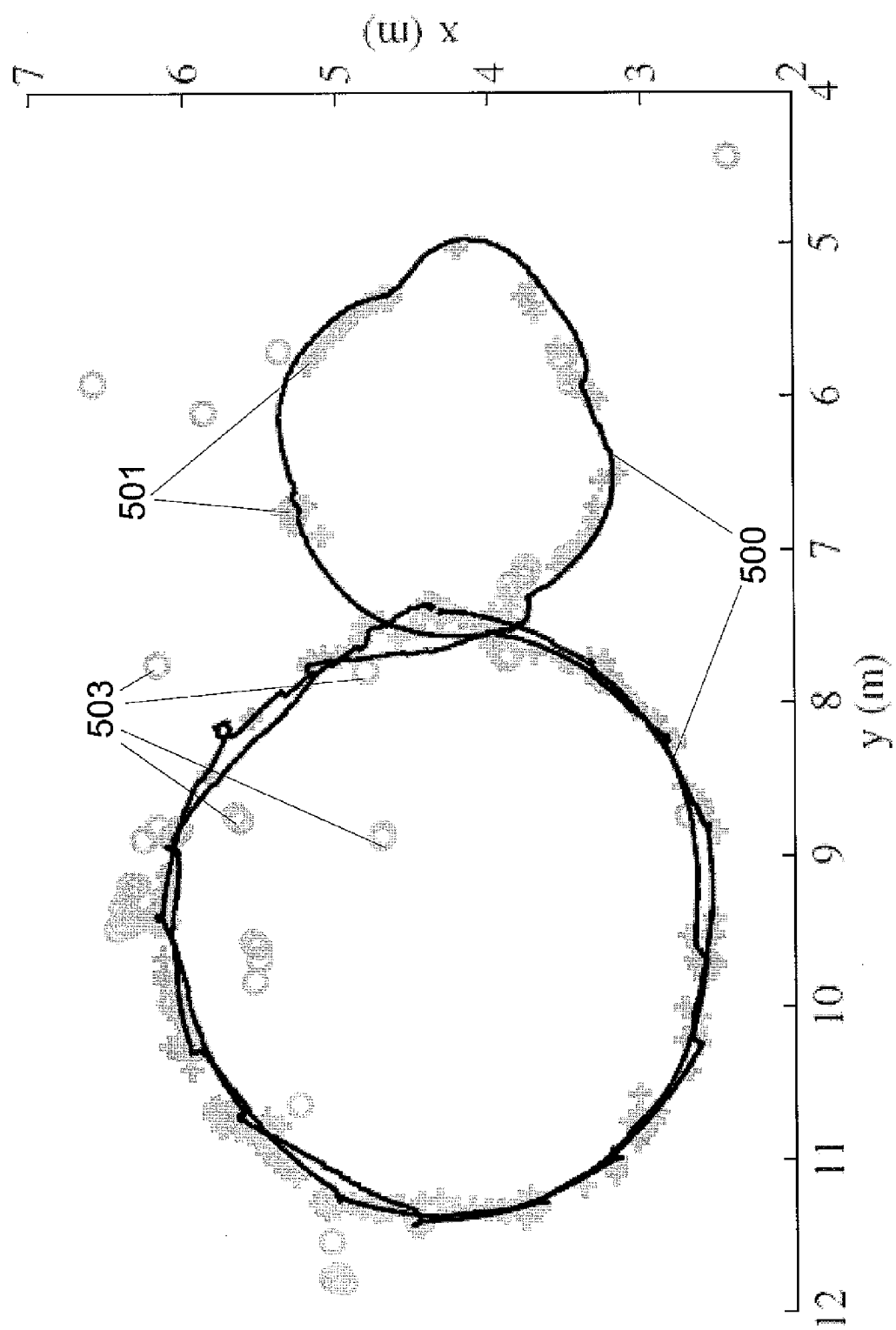
FIG. 5 is a plot showing a trial run with a test subject walking a figure-eight-shaped path, showing the estimated trajectory b" (-), triangulated positions, classified according to whether the UWB measurements are clean (+) or contain outliers (o), and the UWB receivers (o), such that the tightly coupled approach successfully bridges the 'gaps' in the triangulated positions and is not affected by outliers.

The following discussion gives the results for a 35s trial, where the test subject walked a figure-eight path. FIG. 5 shows a top view of the estimated trajectory of a trial run with a test subject walking a figure-eight-shaped path, showing the estimated trajectory $b^n$ (−) 500, triangulated positions, classified according to whether the UWB measurements are clean (+) 501 or contain outliers (o) 503, and the UWB receivers (o), such that the tightly coupled approach successfully bridges the 'gaps' in the triangulated positions and is not affected by outliers.

Figure 6:
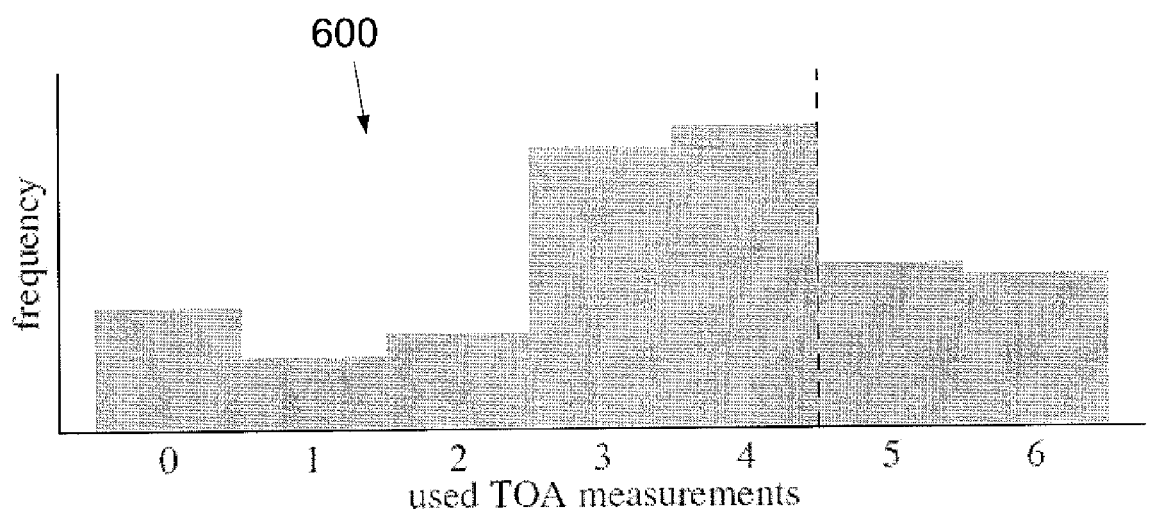
FIG. 6 is a histogram of the number of TOA measurements used in the EKF after outlier rejection. Triangulation requires ≧5 TOAs and is only sparsely possible.

In particular, it can be seen that the triangulated positions (standalone UWB) contain many gaps as well as many outliers. In contrast, the proposed system is capable to estimate a continuous trajectory 500 of the test subject. The tightly coupled fusion of UWB and inertial measurements makes it possible to make use of any number of UWB measurements (including as few as 0) and is hence able to bridge the "gaps" where not enough UWB measurements are available for traditional 3D triangulation. Furthermore, the classification of the UWB solutions in FIG. 5 shows that the innovative approach described herein successfully detects and deals with outliers in the UWB measurements. The advantage gained by being able to utilize all available information is quantified in FIG. 6. In particular, FIG. 6 shows a histogram 600 of the number of TOA measurements used in the EKF after outlier rejection. Although, in theory, 4 TOA measurements should be sufficient for a 3D position solution, in practice at least 5 measurements are required for successful traditional triangulation of UWB measurements based on TDOA, implying that more than half of the available UWB measurements would have to be discarded. This results in prolonged periods without a position solution, where loosely coupled UWB inertial approaches are also bound to fail.

Figure 7:
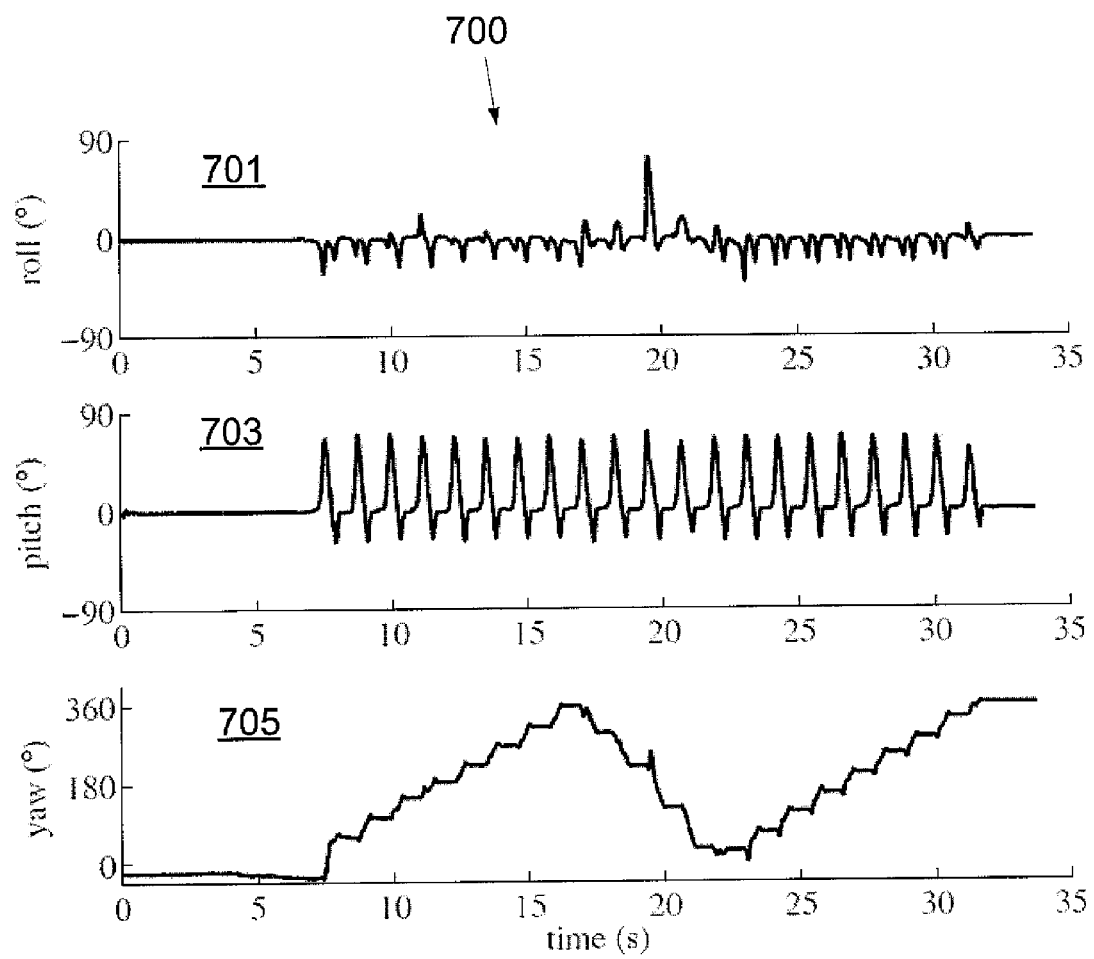
FIG. 7 is a plot of estimated orientation $q^{nb}$, expressed in Euler angles.
Figure 8:
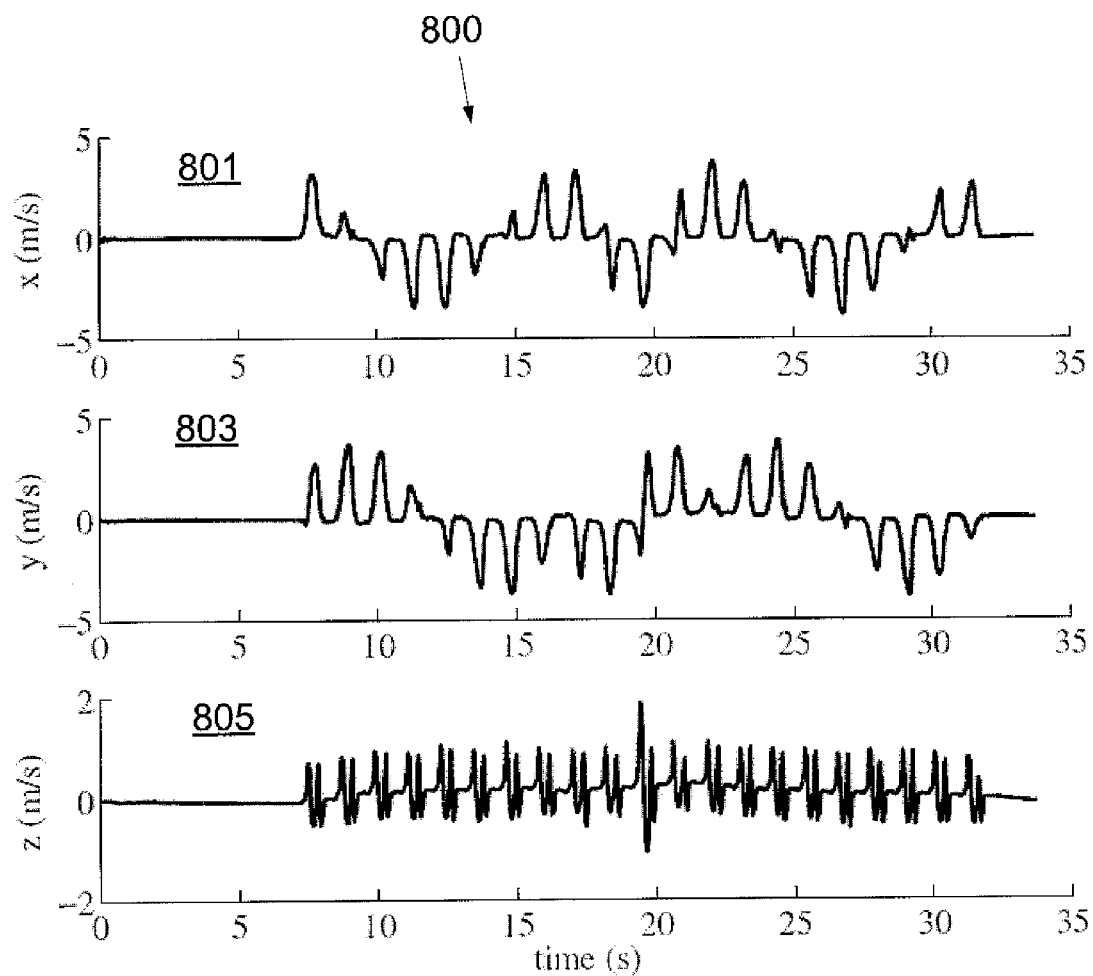
FIG. 8 is a plot of estimated velocity $b^n$.

The proposed system not only estimates the position of the sensor unit, but also provides very smooth orientation and velocity estimates, shown in FIG. 7 and FIG. 8. In particular, FIG. 7 is a plot 700 of estimated orientation $q^{nb}$, expressed in Euler angles, showing orientation estimates for the roll 701, pitch 703, and yaw 705 axes. FIG. 8 is a plot 800 of estimated velocity $b^n$ in the x 801, y 803, and z bo5 axes. It will be appreciated by those skilled in the art that the orientation and velocity estimates of the quality disclosed in FIGS. 7 and 8 would be difficult or impossible to obtain using standalone UWB systems.

Figure 9:
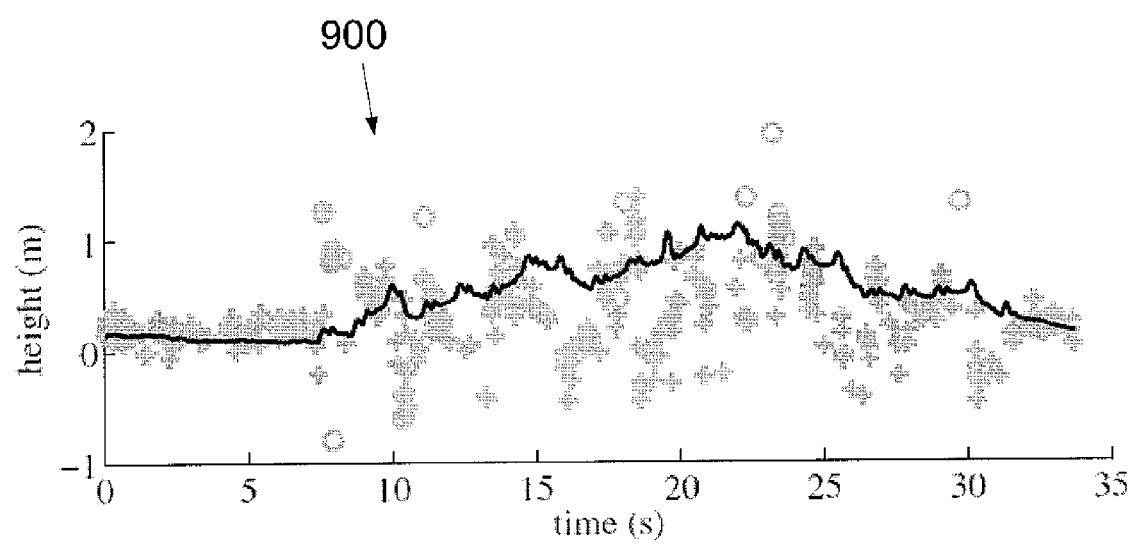
FIG. 9 is a time-dependent plot of estimated height $b_z^n$ showing the estimated trajectory (−) and triangulated positions (+,o), with a large variation in height indicating the presence of calibration errors and/or a dilution of precision due to the limited geometry of the particular test setup.

FIG. 9 shows a plot 900 of the estimated height of the sensor during the test. Although the height results are not quite as accurate as the other results, it is known that a more favourable geometry of the placements of the UWB receivers will improve the vertical and time dilution of precision (DOP). Additionally, further calibration of the UWB system would improve this accuracy even further. The above experiments focused on horizontal tracking in a very practical and limited UWB receiver configuration while still effectively demonstrating 3D tracking.

In this disclosure, a 6DOF tracking algorithm is described for estimating both position and orientation based on tightly coupled fusion of UWB and inertial sensors. The system remains robust and accurate even in the presence of multipath and NLOS conditions. The system is able to bridge periods with limited UWB measurements and to successfully detect and account for outliers in the individual TOA measurements.

To further improve the capability of the system to track 3D position, even in setups with limited geometries as discussed above, the inventors disclose a further system wherein static pressure sensors (barometers) are added to the object to be tracked. Such static pressure sensors, preferably miniature units, typically based on MEMS technology, are capable of measuring ambient air pressure. An example of a suitable sensor is the SCP1000 sensor from VTI Technologies of Finland, represented by sales representatives in Pasadena, Calif. and Beaverton, Oreg. in the United States.

After applying known methods to compensate for effects of temperature, humidity, pressure at sea level and applying an atmospheric model, the sensed pressure data can be used to estimate absolute altitude of the object to be tracked. Applying a known height to the UWB transmitter when solving the 3D position in an UWB system is a known method and will not be explained further here. In many practical situations, in particular for very small and low-cost (MEMS) pressure sensors, the absolute accuracy is limited, in particular due to unknown offsets. Additionally, atmospheric models and local pressure fluctuations can cause the above described system to lose accuracy. Note that similar pressure sensors are available for use in mediums other than air, e.g. water, and that more dense mediums enable much higher accuracies for estimation of vertical direction.

In a preferred implementation, at least one of the UWB receivers is further equipped with a reference pressure sensor. This will allow the calculation of a relative pressure difference between the UWB transmitter and receiver, essentially mitigating several possible causes of error when utilizing pressure sensors to estimate altitude/height. In this way, the (relative) height between receiver and transmitter can be determined, and 3D position tracking is enabled for setups with limited geometries as discussed above. A significant problem inherent to small, low-cost MEMS pressure sensors is the relatively high noise (e.g., on the order of 30 cm) and the low bandwidth of the sensor. In practice this means that small vertical movements and fast movements cannot be measured accurately with pressure sensors.

The combination with UWB measurements could make the combined solution more accurate, but an ideal system is obtained when the pressure sensor is combined with the tightly coupled inertial and UWB system as described above.

Depending on the application, the 6DOF position and orientation estimates resulting from the invention may be needed in real-time, or may be instead required only offline. In situations wherein the data is to be used in real-time, one must adapt the setup for the system to be suitable for the application at hand.

Figure 10:
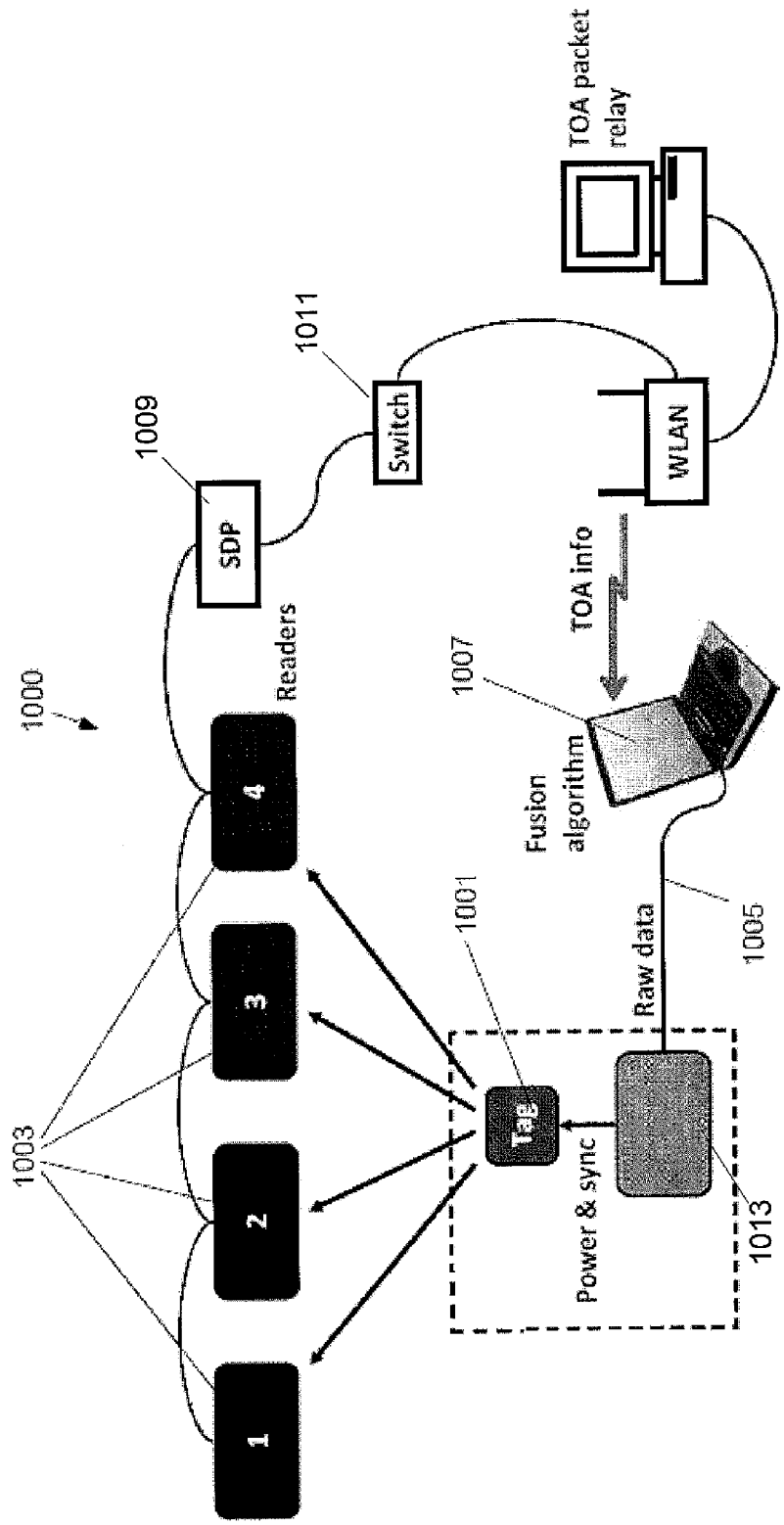
FIG. 10 is a schematic view of an implementation environment within which the present invention may be employed.

In one typical application, the pose data is employed in real-time on a fixed or mobile station not moving in relation to the object being tracked, i.e., a typical tracking or motion capture application. The implementation 1000 of the invention within such a system is shown in FIG. 10. The transmission of UWB signals to the UWB receivers 1003 is done by the UWB transmitter 1001 and the TOA data is received at the station 1007. The inertial and/or pressure data is received at the same station 1007 from the IMU 1013, either via wired or wireless connections 1005, and the sensor fusion algorithm described above is executed at the station 1007 via the execution of computer-executable instructions read from a computer-readable medium, e.g., a disc or the like. The SDP 1009 is a synchronization device and the switch 1011 is a means of creating a LAN for the data communication.

In other applications, the pose data is needed in real-time at the object being tracked, i.e., a typical navigation application. Of course, the sensor fusion calculations could still be performed as described in FIG. 10 for a motion capture application and the pose data could be subsequently transmitted to the object being tracked. However, this is not ideal due to the delays introduced by transmitting the inertial data first to a remote processor for processing, and then back to the object for further use in, for example, a control system. The reason being that the inertial data delay (latency) is much more important than the latency of the UWB TOA data (which is known in the case of hardware synced UWB transmitter and inertial sensor).

Figure 11:
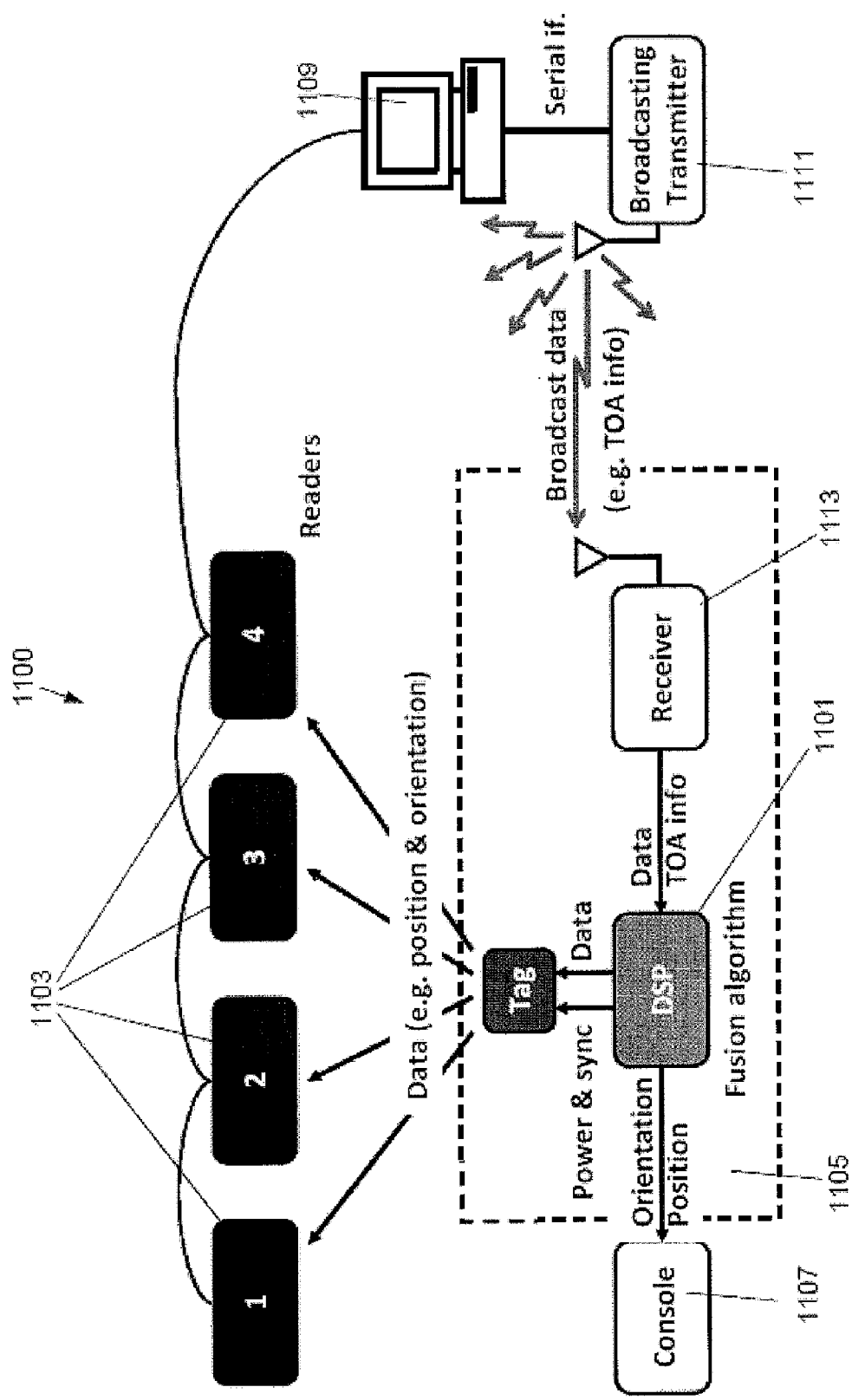
FIG. 11 is a schematic view of an alternative implementation environment within which the present invention may be employed.

An improved system for fulfilling this application is illustrated schematically in FIG. 11. In such a configuration the system 1100 should include a processor such as DSP 1101 to run the sensor fusion algorithm and process the TOA data, and optionally the pressure data, from one or more UWB receivers 1103. Data from the UWB system must be received either by wire or wirelessly by the sensor unit 1105 so that the pose data can be made available, either by wire or wireless, to a "console" 1107 on the object being tracked itself.

Thus, in overview, the DSP 1101 at the sensor unit 1105 receives the TOA data from a relay 1109. Internally, the DSP 1101 uses the TOA in its fusion filter and determines the orientation and position. In greater detail, the receivers 1103 determine the uncalibrated TOA of packets and retrieve the data contained in the packets. The information is sent in a TOA packet to the relay 1109.

A relay application receives the TOA packets from the readers at the relay 1109, converts the information, and sends it to a connected wireless transmitter 1111. The relay application is discussed in more detail below. In an embodiment of the invention, the broadcasting transmitter 1111 is a simple ISM (2.4 GHz) transmitter, and the receiver 1113 at the sensor unit 1105 is a simple ISM (2.4 GHz) receiver that receives addressed radio packets. The receiver 1113 forwards the payload data from the packet to the connected DSP 1101 if the receiver 1113 is the addressee. The DSP 1101 runs a fusion algorithm that receives the TOA information and determines the position and orientation based on the inertial information and the TOA information.

In a further embodiment within the above described motion capture or tracking application, it may sometimes be desirable to transmit the inertial data over the UWB transmission link. The available bandwidth is limited but this technique has the advantage of eliminating the need for a separate radio transmission link in which the sensor unit 1105 is equipped with a small ISM receiver. The central system receives the TOA packets from the readers 1103 and is equipped with a simple ISM transmitter that broadcasts the data received from the relay 1109.

The above disclosure focused primarily on high end systems requiring very accurate 6DOF tracking and high update rates with unrestricted dynamics (e.g. no motion models) in the movement to be tracked. However, the same tightly coupled approach can be applied for systems requiring less accuracy, and that allow some degree of modeling of the dynamics of the object to be tracked (e.g., applying a motion model). Instead of utilizing a complete IMU it is also possible to utilize only a 3D accelerometer. This can be particularly attractive in applications requiring highly miniaturized and low-cost sensor units to be fixed to the object to be tracked. Today, 3D accelerometers are highly miniaturized and are available at very low-cost. An example of a suitable accelerometer is the ADXL346 available from Analog Devices of Norwood, Mass. in the United States.

If the orientation change can be expected to be small between consecutive samples (i.e., the motion model) it is possible to derive roll and pitch by combining UWB TOA measurements with the 3D accelerometer readings, as well as heading when the object is undergoing acceleration. Such motion models are typically very well applicable to less dynamic objects such as robots, carts, vehicles etc. This approach can be suitably combined with magnetometers (2D or 3D) as they are also very small and low cost. A suitable integrated single device containing a 3D accelerometer and a 3D magnetometer is for example the AMI602 available from Aichi Steel of Tokai-shi. Aichi, Japan, to provide a reference for heading direction as well as an estimate of angular rotation velocity to reduce the assumptions needed in the UWB tight coupling algorithm. As mentioned above, pressure sensors can further be added to the system since atmospheric pressure sensors are also relatively small and low-cost, compared to rate gyroscopes.

Physically attaching multiple position trackers/sensors to a single rigid body may improve estimates of position but is especially useful in estimating orientation or improving estimates of orientation. With respect to UWB, this can be advantageous since most objects are transparent to UWB radiation. If the object is substantially constructed from materials that have a known refraction index with respect to UWB radiation, such as glass or water, the errors due to the lower speed of light in such material can be predicted in the tightly coupled scheme by a inputting the position of the UWB tag on the object beforehand and tracking the orientation, thus knowing the length of the path of the UWB transmission through the material, and compensating for the time delay caused thereby.

When tracking multiple objects at the same time, it is often crucial to the whole system performance that all the measurements made can be aligned accurately in time, i.e., be time synchronized. It is common to achieve time synchronization by hardwiring the different units, or by using elaborate methods of estimating clock offsets and drift. In a UWB system, which embodies very accurate clocks, there is an interesting method to achieve very accurate time synchronization of multiple IMU units with integrated UWB transmitters tags that are hardware synchronized with the IMU.

Figure 12:
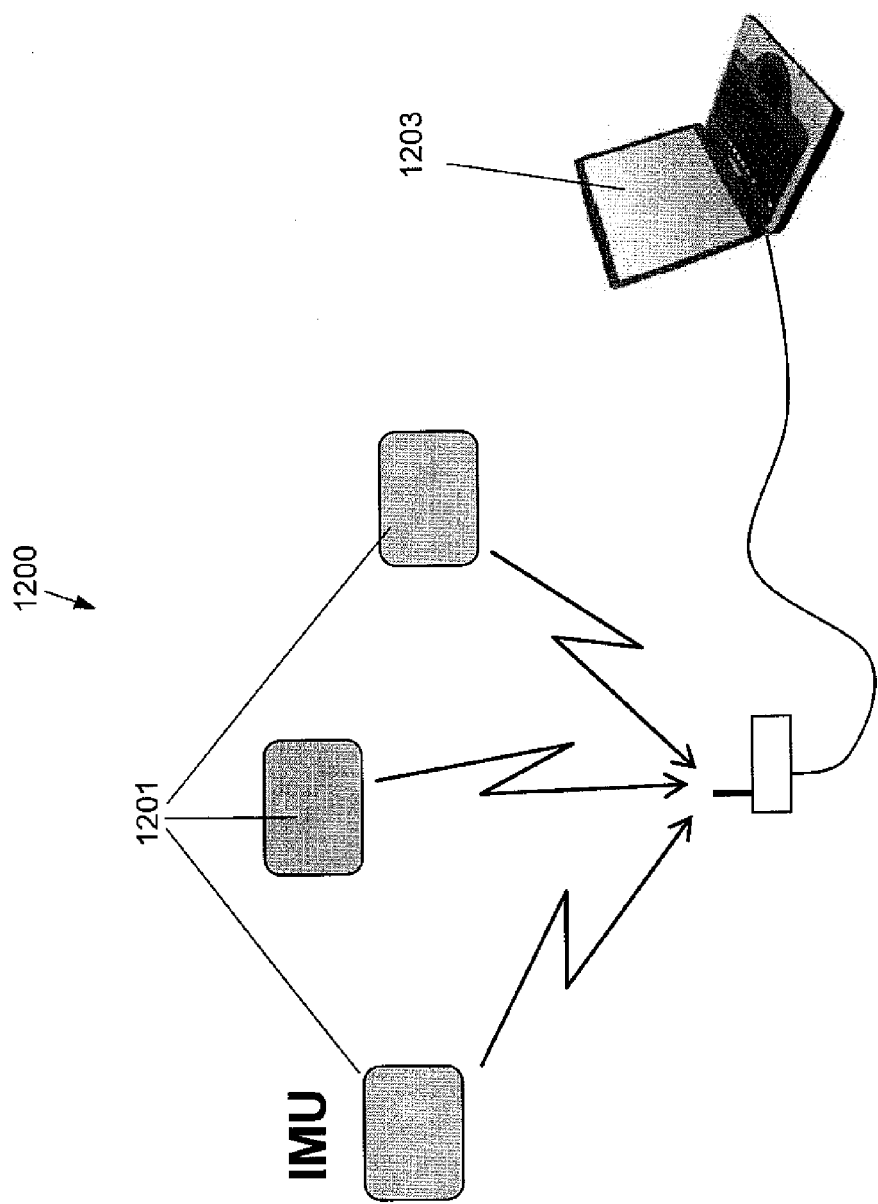
FIG. 12 is a schematic view showing an environment including an array of IMUs.

By way of example, consider a system 1200 with a number of IMUs 1201 running at the same sample rate and that transmit their data wirelessly to a receiving station 1203 as illustrated in FIG. 12. There always will be some nondeterministic delay associated with the wireless transmission when conventional radio technology is used. Because the tags 1207 are not synchronized with each other and therefore the clocks are uncorrelated, this delay means that if the measurements are to be combined at a central location, the clock drift, i.e., the actual timestamp of the individual measurements, is unknown.

Figure 13:
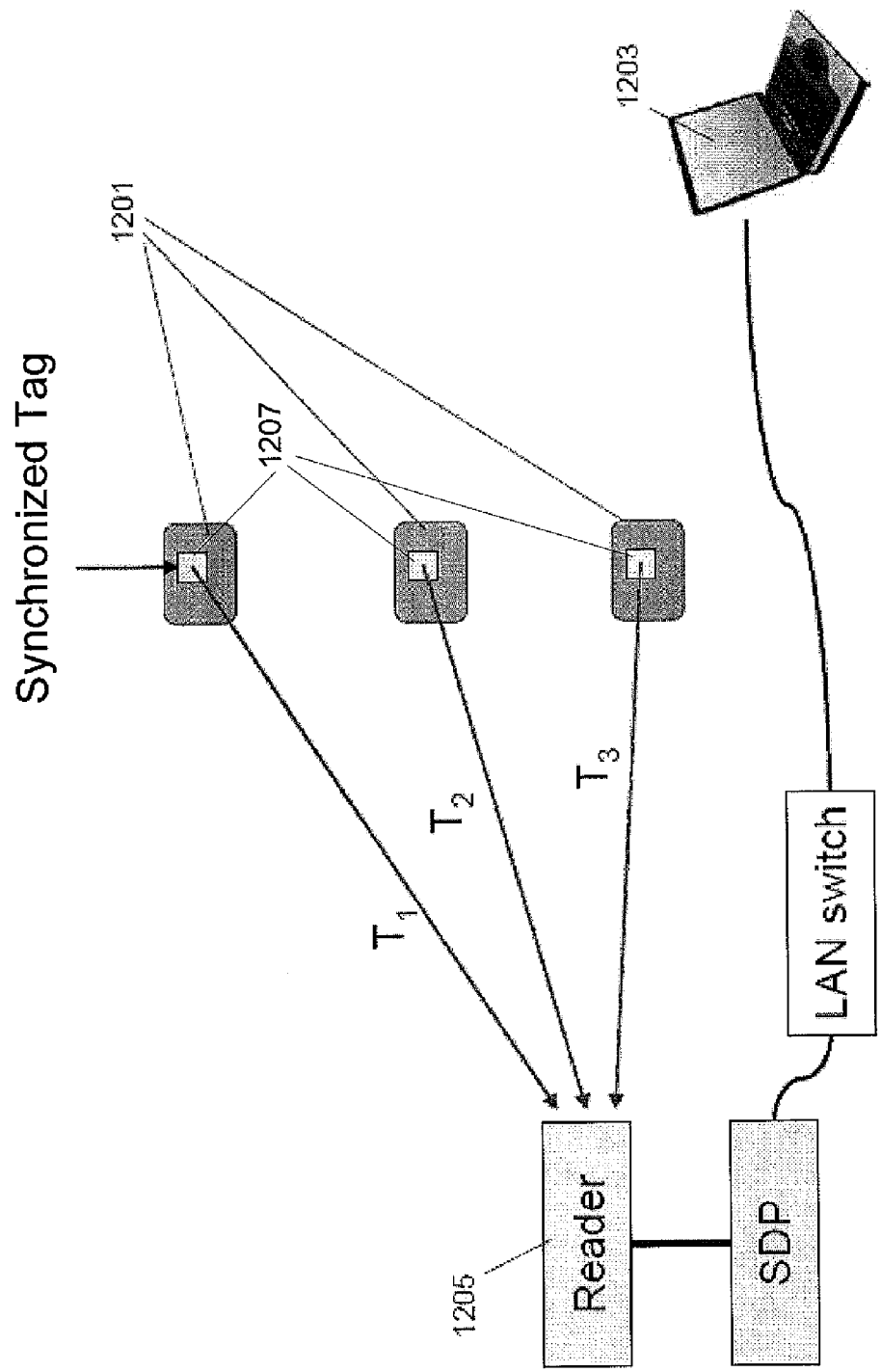
FIG. 13 is a schematic view of an environment providing time synchronization within an embodiment of the invention.

Now assume the situation in which the IMUs 1301 are as illustrated in FIG. 13. The resulting delay between the time-of-transmission and the time at which the TOA packet is processed (soft timestamp) is approximately 2 ms under low load. This value is not constant and increases when the load increases. This means that at the host application 1203, the measurements from the different IMUs 1201 can still not be correlated. Instead, it would be better to use the TOA at the reader 1205. However, this puts requirements on the size of the TOA. Typical UWB systems maintain a TOA expressed as a coarse and fine timestamp, each consisting of 8-bits. When working with traditional TDOA algorithms, such a small coarse timestamp is more than sufficient. However, this means that the timestamps of the different IMU measurements can only be correlated when the sample frequency is larger than approximately 400 kHz because of the TOA clock-rollover at every 2.56 µs. If the size of the coarse timestamp were 24 bits, this would support a minimum sample rate of approximately 10 Hz. Preferably, the coarse timestamp is even larger, e.g., 32 bits.

Figure 14:
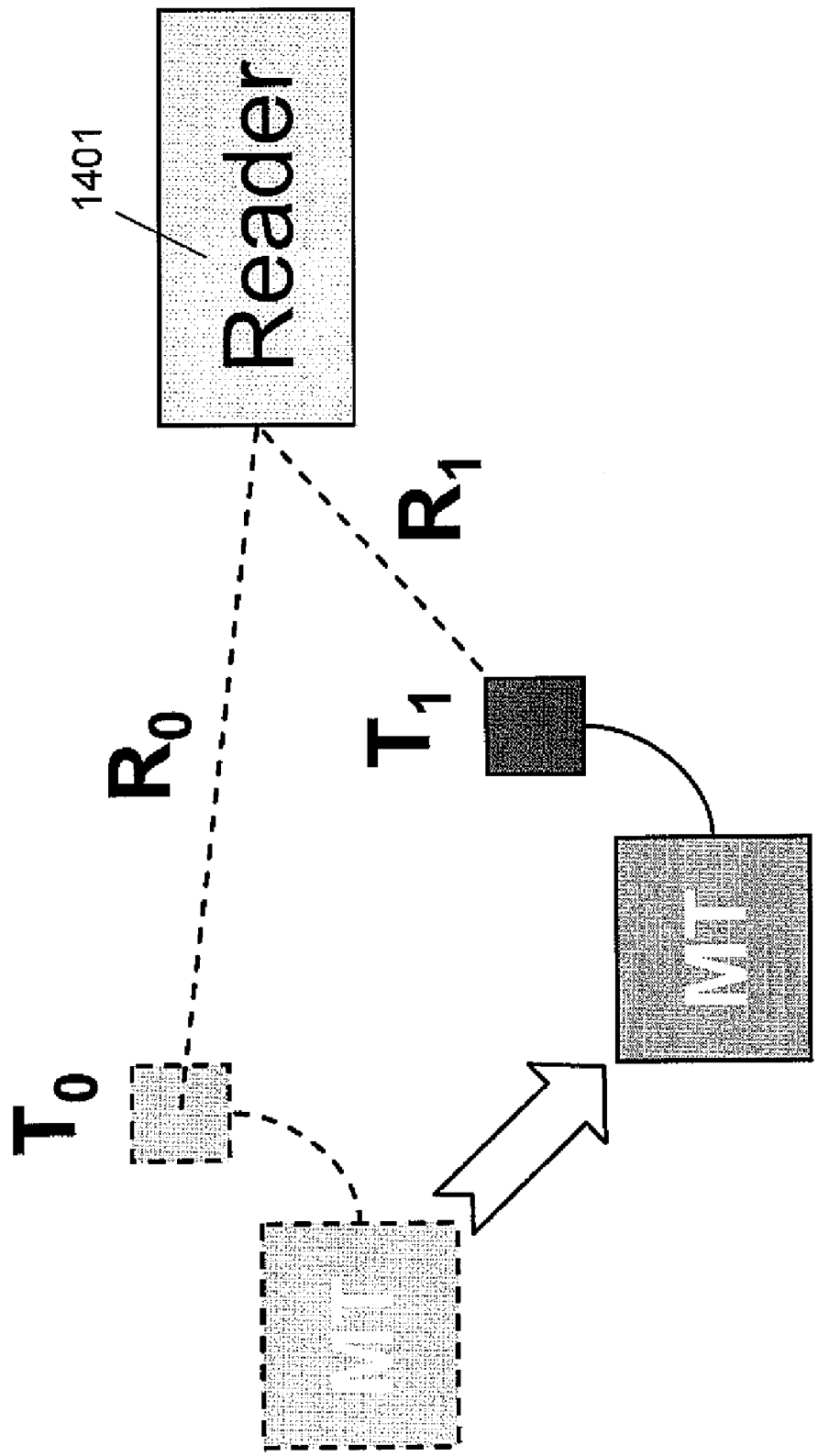
FIG. 14 is a schematic view of a further environment providing time synchronization within an embodiment of the invention.

When the trigger delay from IMU to UWB transmitter is accurately defined and the IMU clock is also very accurate, even more advanced processing methods can be applied to estimate the 6DOF motion of the object Suitable clocks for use in the IMU as a trigger source are for example ultra low jitter clock such as e.g., J-series from SiliconClocks.com, with a phase jitter of 0.35 ps. Considering the arrangement shown in FIG. 14, if the duration of the time interval between two consecutive UWB transmissions is known exactly, the movement perpendicular to the reader 1401, i.e. the range difference, can be determined. For explanatory purposes refer to the following equations:

$$\tau_1 - \tau_0 = \Delta T$$
$$TOA_1 - TOA_0 = \Delta T + \frac{R_1 - R_0}{c} \Rightarrow$$
$$R_1 - R_0 = c(TOA_1 - TOA_0 - \Delta T)$$

This is valuable information for the tightly coupled approach such as disclosed above, since it provides much more information from the UWB measurements. The tightly coupled approach as described above already incorporates this mechanism, although implemented implicitly rather than explicit as in the above equations, without the need for further additions since the time of transmission is estimated, by adapting the driving noise in the UWB state equation, but it may be advantageous to expand the clock error models further.

The most important parameter for the required clock is the phase jitter. Less important is the clock drift over time for which the algorithm could compensate. Typically, this jitter must be less than 1 ps, however, larger values might also be possible if the stochastic characteristics are known. For example, white noise could be used in the filter.

Those skilled in the art will appreciate the possibility of combining the invention described above with other systems for positioning if higher accuracy is needed, e.g., for a particular sub-area of a tracking volume. Such systems are for example systems based on camera systems. If a much larger area tracking system is needed in and around the area that is configured to be tracked with the disclosed system, the system can also be combined with another suitable system such as GPS. Applications for such a scenario include, for example, logistics where very accurate tracking is needed in a particular part of a building, but where less accuracy is needed outdoors.

Moreover, although the examples given herein have referenced UWB by way of a specific implementation, the principles described herein are applicable far beyond UWB systems. Indeed, any system that generates TOA measurements can benefit from the principles described herein. For example, ultrasonic systems and sonar systems (e.g., ultrasonic underwater systems) could employ the same principles, using sound signals rather than RF pulses. This may be beneficial for environments wherein UWB cannot or should not be used, e.g., for tracking divers or objects under water.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in variations thereof is encompassed by the invention unless otherwise indicated herein or otherwise clearly contradicted by context.

The invention claimed is:

1. A method for providing six-degree-of-freedom (6DOF) tracking of an object comprising:
affixing a sensor unit to the object, wherein the sensor unit includes one or more pulse transmitters, each being adapted to transmit a pulse signal, and a plurality of inertial sensors;
receiving, remotely from the object, at each of a plurality of time synchronized pulse receivers, a signal from each of the one or more pulse transmitters to derive a time of arrival for each such sensor, wherein the pulse transmitters are UWB transmitters and the pulse receivers are UWB receivers, and wherein the UWB transmitters and inertial sensors are time synchronized at the hardware level to provide a time error between the inertial sensors of less than 1 ms;
receiving at a processing location the time of arrival information as well as inertial data from each of the plurality of inertial measurement sensors; and
processing the received time of arrival information and the inertial data via a tightly coupled sensor fusion algorithm to yield an estimate of a position and orientation of the object, wherein the tightly coupled sensor fusion algorithm requires processing of the time of arrival data and the inertial data without first performing a position estimate from the time of arrival data prior to integration with the inertial data, and wherein the inertial data is used to predict the time of arrival data and to eliminate erroneous outliers therein.

2. The method for providing six-degree-of-freedom (6DOF) tracking of an object according to claim 1, wherein the plurality of inertial sensors are microelectromechanical systems.

3. The method for providing six-degree-of-freedom (6DOF) tracking of an object according to claim 1, wherein the plurality of inertial sensors comprise a 3D accelerometer.

4. The method for providing six-degree-of-freedom (6DOF) tracking of an object according to claim 1, wherein the step of receiving at a processing location the time of arrival information comprises receiving the time of arrival information from a network entity that is remote from the object being tracked and from the UWB receivers.

5. The method for providing six-degree-of-freedom (6DOF) tracking of an object according to claim 1, wherein the inertial data includes accelerometer measurements and gyroscope measurements.

6. The method for providing six-degree-of-freedom (6DOF) tracking of an object according to claim 1, wherein the sensor unit further includes a pressure sensor, the method further comprising tracking the object in a vertical dimension via the pressure sensor.

7. The method for providing six-degree-of-freedom (6DOF) tracking of an object according to claim 1, wherein one or more UWB receivers include a pressure sensor.

8. A method for providing six-degree-of-freedom (6DOF) tracking of an object comprising:
affixing a sensor unit to the object, wherein the sensor is associated with a processor local to the object, and the sensor unit includes one or more UWB transmitters, each being adapted to transmit a UWB signal, and a plurality of inertial sensors, the UWB transmitters and inertial sensors being synchronized at the hardware level to provide a time error between the inertial sensors of less than 1 ms;
receiving a UWB signal at each of a plurality of time synchronized UWB receivers remote from the object from each of the one or more UWB transmitters to derive a time of arrival for each receiver;
receiving at the processor inertial data from each of the plurality of inertial sensors;
receiving the time of arrival data at the processor; and
processing the time of arrival data and the received inertial data at the processor via a tightly coupled sensor fusion algorithm to yield an estimate of a position and orientation of the object, wherein the tightly coupled sensor fusion algorithm requires processing of the time of arrival data and the inertial data without first performing a position estimate from the time of arrival data prior to integration with the inertial data, and wherein the inertial data is used to predict the time of arrival data and to eliminate erroneous outliers therein.

9. The method for providing six-degree-of-freedom (6DOF) tracking of an object according to claim 8, wherein the object is associated with a console local to the object, and wherein the method further comprises transmitting the estimate of position and orientation to the console.

10. The method for providing six-degree-of-freedom (6DOF) tracking of an object according to claim 8, wherein the plurality of inertial sensors are microelectromechanical systems.

11. The method for providing six-degree-of-freedom (6DOF) tracking of an object according to claim 8, wherein the plurality of inertial sensors comprise at least one 3D accelerometer.

12. The method for providing six-degree-of-freedom (6DOF) tracking of an object according to claim 8, wherein the step of receiving the time of arrival data at the processor includes first receiving the time of arrival information from a network entity that is remote from the object being tracked and from the UWB receivers.

13. The method for providing six-degree-of-freedom (6DOF) tracking of an object according to claim 8, wherein the plurality of inertial sensors includes one or more accelerometers and one or more gyroscopes.

14. The method for providing six-degree-of-freedom (6DOF) tracking of an object according to claim 8, wherein at least one of the sensor unit and the UWB receivers further includes a pressure sensor, the method further comprising tracking the object in a vertical dimension via the pressure sensor.

15. A method for providing six-degree-of-freedom (6DOF) tracking of a multi-segment jointed object comprising:
affixing a sensor unit to one or more segments of the object, wherein each sensor unit includes one or more UWB transmitters, each being adapted to transmit a UWB signal, and a plurality of inertial sensors, the UWB transmitters and the inertial sensors being synchronized at the hardware level for each segment to yield a time error between the inertial sensors of less than 1 ms;
receiving, remotely from the object, at each of a plurality of time synchronized UWB receivers, a signal from each of the one or more UWB transmitters to derive time of arrival data associated with each UWB receiver;
receiving inertial data from the plurality of inertial sensors; and
processing the time of arrival data and the inertial data via a tightly coupled sensor fusion algorithm for each segment to yield an estimate of a position and orientation of each segment, wherein the tightly coupled sensor fusion algorithm requires processing of the time of arrival data and the inertial data without first performing a position estimate from the time of arrival data prior to integration with the inertial data, and wherein the inertial data is used to predict the time of arrival data and to eliminate erroneous outliers therein.

16. The method for providing six-degree-of-freedom (6DOF) tracking of an object according to claim 15, wherein the plurality of inertial sensors are microelectromechanical systems.

17. The method for providing six-degree-of-freedom (6DOF) tracking of an object according to claim 15, wherein the plurality of inertial sensors comprise at least one 3D accelerometer for each segment.

18. The method for providing six-degree-of-freedom (6DOF) tracking of an object according to claim 15, wherein at least one sensor unit or one UWB receiver further includes a pressure sensor, the method further comprising tracking at least one segment of the object in a vertical dimension via the pressure sensor.

* * * * *